(No Model.)  5 Sheets—Sheet 1.
A. CAMPBELL.
PIPE FLANGING MACHINE.
No. 323,109. Patented July 28, 1885.
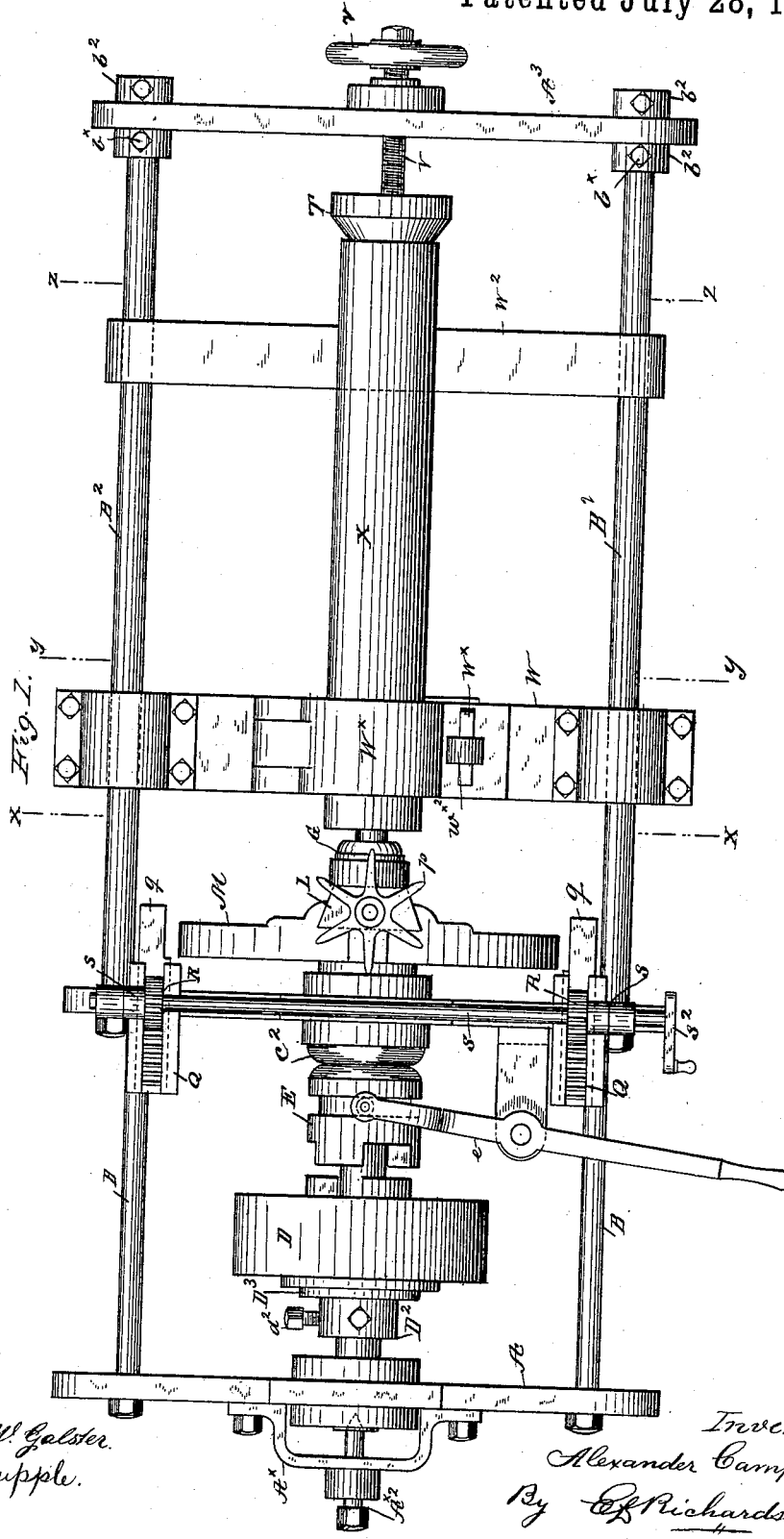
Witnesses:
Gabriel J. W. Galster.
S. M. Supple.
Inventor
Alexander Campbell,
By C. F. Richards &c.
Attorneys.

(No Model.) 5 Sheets—Sheet 2.
A. CAMPBELL.
PIPE FLANGING MACHINE.
No. 323,109. Patented July 28, 1885.
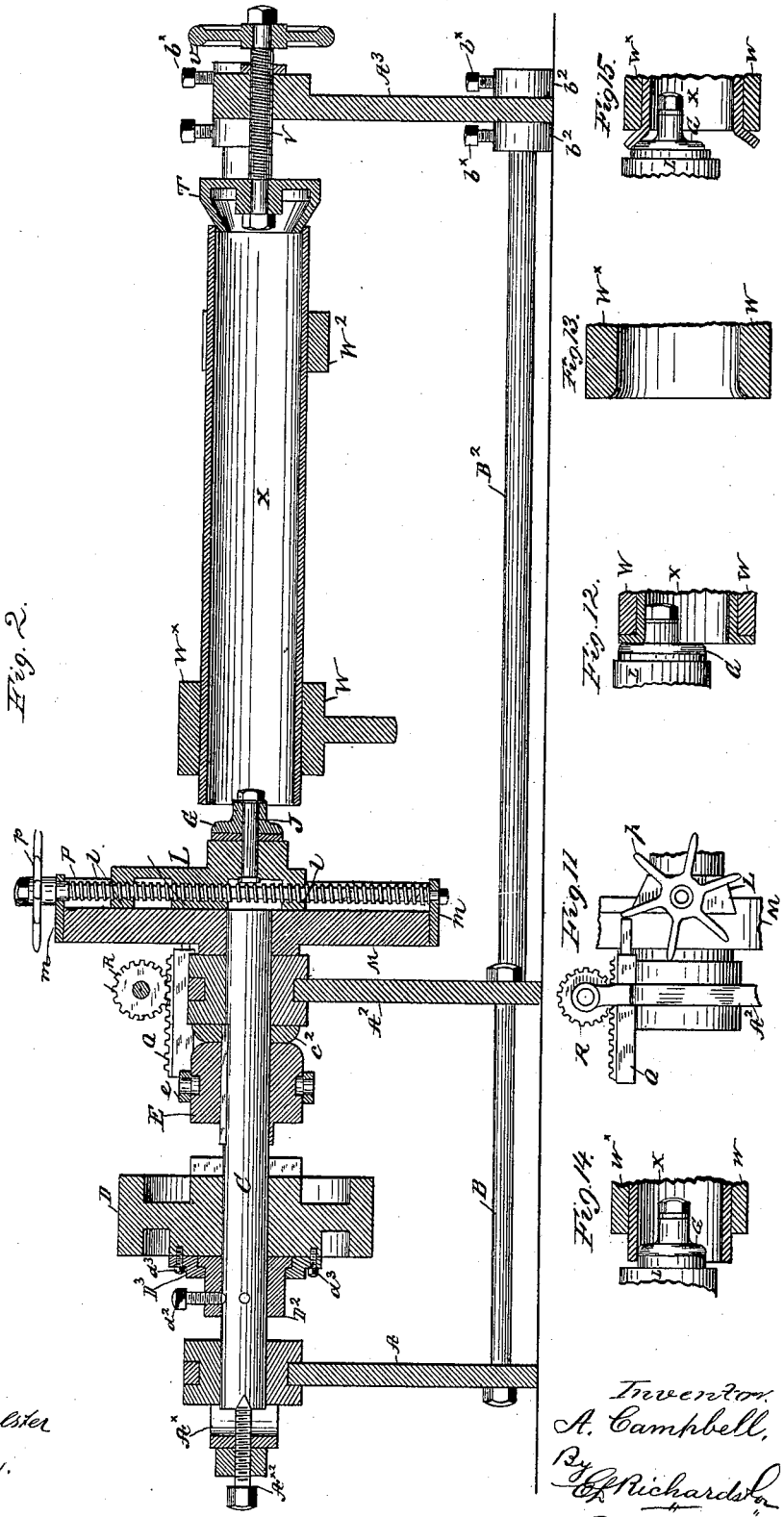
Witnesses:
Gabriel J. W. Galster
K. M. Supple.
Inventor:
A. Campbell,
By E. Richards
Attorneys.

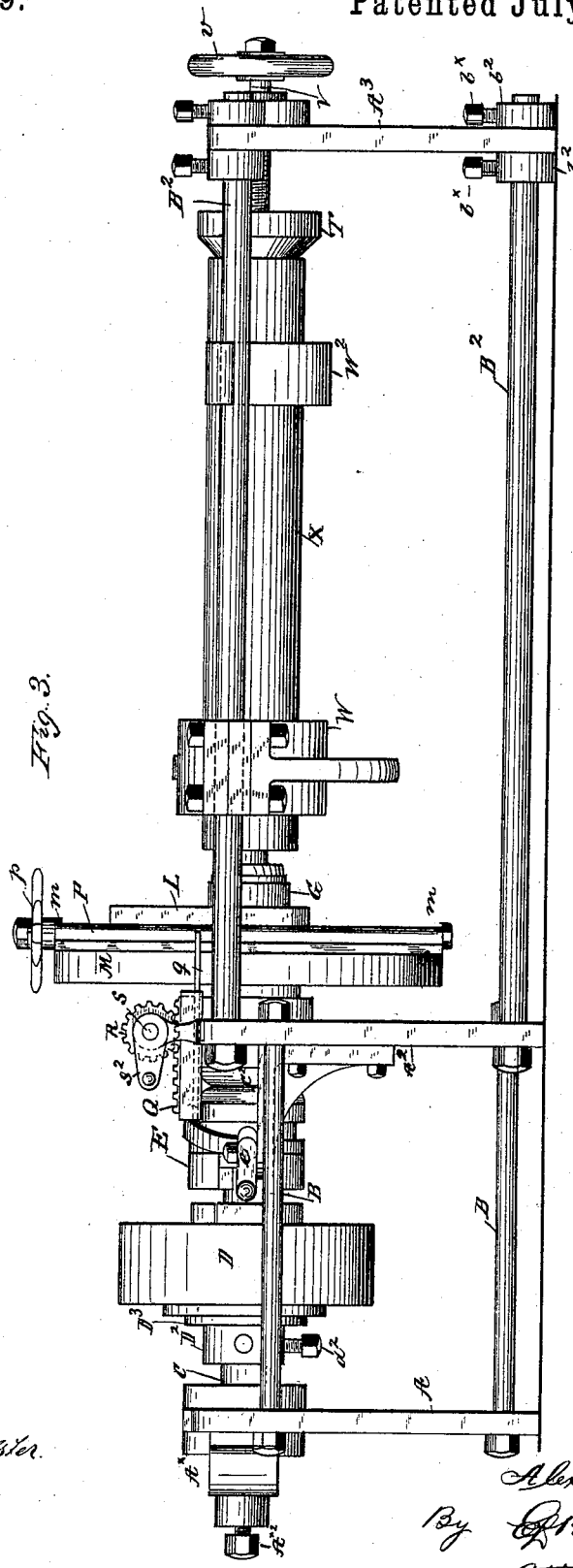

(No Model.) 5 Sheets—Sheet 4.
A. CAMPBELL.
PIPE FLANGING MACHINE.
No. 323,109. Patented July 28, 1885.
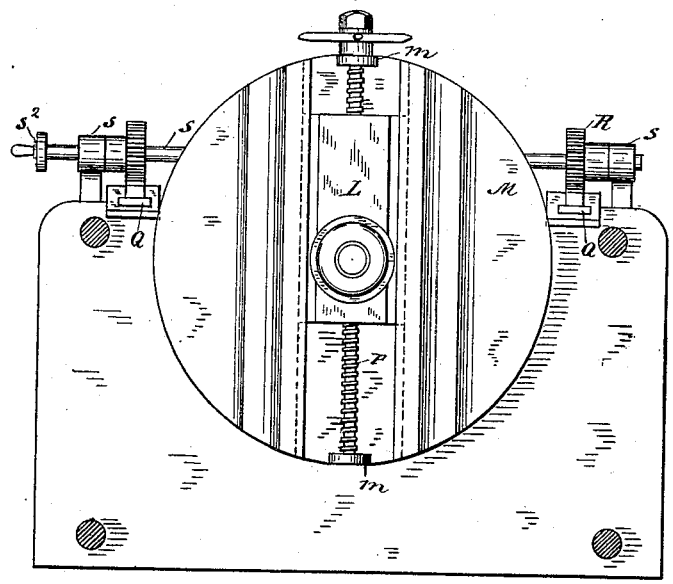
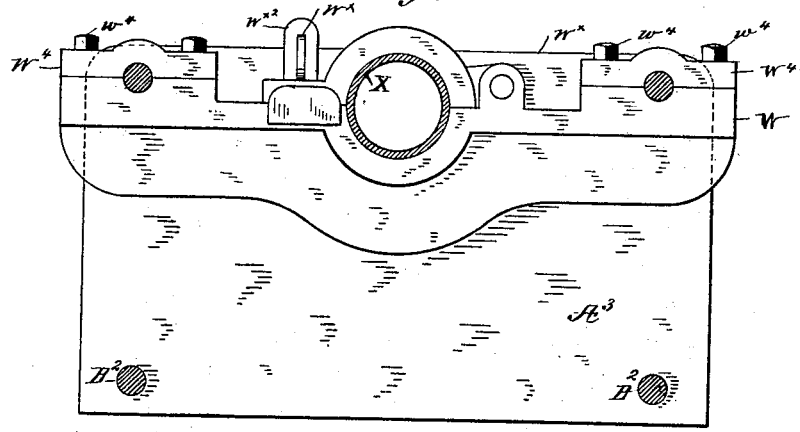
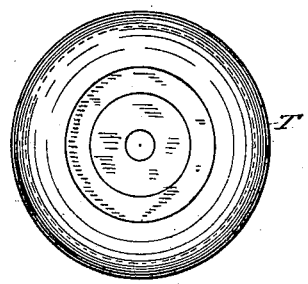
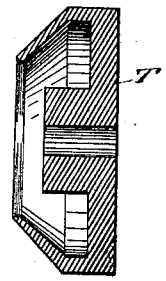
Witnesses:
Gabriel J. W. Galster
N. M. Supple.
Inventor:
Alexander Campbell,
By E. F. Richards & Co.
Attorneys.

(No Model.)  5 Sheets—Sheet 5.

A. CAMPBELL.
PIPE FLANGING MACHINE.

No. 323,109.  Patented July 28, 1885.

Witnesses:
Gabriel J. W. Galster
N. M. Supple.

Inventor:
Alexander Campbell,
By E. F. Richardson
Attorneys.

UNITED STATES PATENT OFFICE.

ALEXANDER CAMPBELL, OF BROOKLYN, NEW YORK.

PIPE-FLANGING MACHINE.

SPECIFICATION forming part of Letters Patent No. 323,109, dated July 28, 1885.

Application filed April 24, 1884. (No model.)

*To all whom it may concern:*

Be it known that I, ALEXANDER CAMPBELL, a citizen of the United States, residing in Brooklyn, in the county of Kings and State of New York, have invented new and useful Improvements in Machines for Forming Flanges on the Ends of Metallic Pipes or Tubes, of which the following is a specification.

My invention relates to means for forming flanges on the ends of metallic pipes or tubes by expanding or turning out the metal thereof.

The invention consists in a novel construction, arrangement, and combination of the various parts of a machine whereby provision is made for adapting it to pipes or tubes of different sizes, for holding the pipe in place and feeding it up to the flange-former, for automatically adjusting the flange-former to the proper position for forming the flange, for starting and stopping the flange-former in its revolution, for attaching the driving-pulley, and for various purposes, hereinafter more particularly described.

Figure 6:
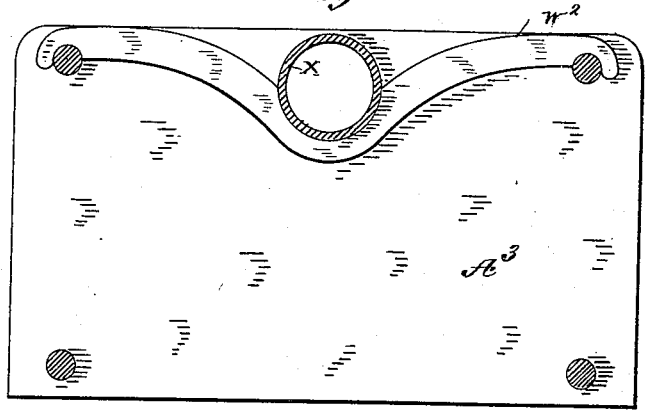
Figure 9:
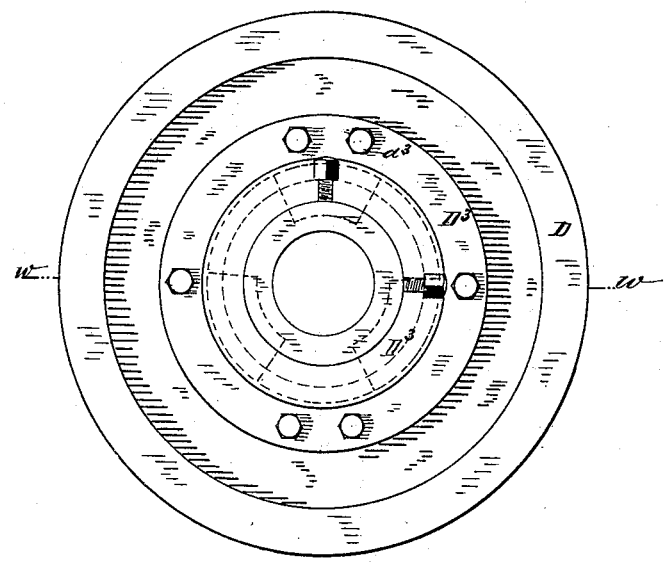
Figure 10:
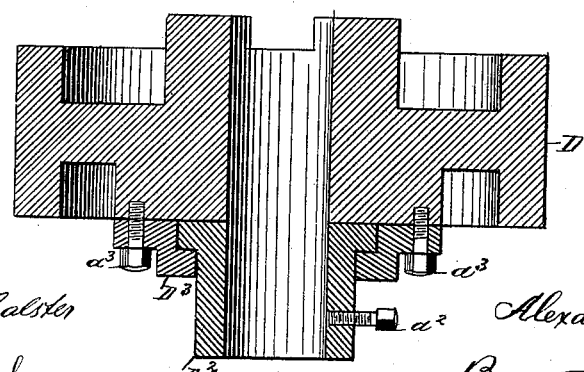

In the accompanying drawings, Figure 1 is a top view of a machine embodying my improvements. Fig. 2 is a central longitudinal vertical section of the same. Fig. 3 is a side view of the same. Fig. 4 is a transverse vertical section taken in the line $x\,x$ of Fig. 1. Fig. 5 is a section taken in the line $y\,y$ of Fig. 1. Fig. 6 is a section taken in the line $z\,z$ of Fig. 1. Fig. 7 is a face view of the flange-former, and Fig. 8 is a central section of the same. Fig. 9 is an end view, looking from the left-hand end of Figs. 1, 2, and 3. Fig. 10 is a section taken in the line $w\,w$ of Fig. 9. Figs. 11, 12, 13, 14, and 15 are detailed views.

The working parts of the apparatus are supported by a frame-work consisting of vertical plates or frames A $A^2$ $A^3$ and horizontal connecting-bars B $B^2$. The plates or frames A and $A^3$ form the ends of the frame-work, and the plate or frame $A^2$ is intermediate between them. The frames A and $A^2$ are permanently connected together by the bars B, and form the portion of the frame-work which supports the main shaft which carries the driving-pulley, the flange-former, and the devices immediately connected therewith. The frames $A^2$ and $A^3$ are connected together by the bars $B^2$, and form the portion of the frame-work which supports the work. The bars $B^2$ are fast in the frame $A^2$, but pass loosely through their seats in the frame $A^3$, and each bar carries on each side of the frame $A^3$ a collar, $b^2$, provided with a set-screw, $b^\times$, for holding it in place on the bar. By loosening the set-screws so as to allow the collar to slide on the bars the frame $A^3$ may be shifted in one direction or the other, so as to accommodate pipes or tubes of different lengths, and when the set-screws are tightened the frame is held firmly in place. The main shaft C is journaled in bearings in the frames A $A^2$, and carries the driving-pulley D, the flange-former G, and the clutch E for engaging and disengaging the pulley and the former.

To the outer side of the end plate of frame A is attached a spider, $A^\times$, provided with a central screw-threaded hole, through which passes a screw, $A^{\times 2}$, the point of which bears against the outer end of the shaft C.

To the shaft C, between the clutch E and the bearing in the plate or frame $A^2$, is attached a flange or collar, $C^2$, which bears against the side of the bearing in said plate or frame, and this flange or collar and the screw $A^{\times 2}$ serve to prevent longitudinal motion of the shaft. When the flange becomes loose from wear or friction, the screw may be tightened, so as to take up any lost motion.

The pulley D serves as both a fast and a loose pulley. It is a fast pulley when engaged by the clutch, and a loose pulley when not so engaged, as the shaft C does not then turn and the pulley turns loosely thereon. The pulley D is prevented from moving longitudinally of the shaft by means of a flanged collar, $D^2$, and a flanged ring, $D^3$, the collar being secured to the shaft by a set-screw, $d^2$, and the ring being secured to the pulleys by screw $d^3$. The flange on the collar bears against the side of the pulley, and the flange on the ring engages outside of the flange on the collar. By this arrangement the pulley is free to turn independently of the shaft. The clutch E is keyed to the shaft C, so as to turn therewith. It is thrown into and out of engagement with the pulley by means of a clutch-lever, $e$, pivoted at a suitable point within convenient reach of the operator.

The flange-former G consists of a flange terminating in a tapering plug for engaging with the inner surface of the end of the pipe to be operated upon. The former is carried by the front end of a short shaft, J, so as to turn freely thereon, and is held in place by a nut, $h$, so that it may be removed and replaced at pleasure or another of different size substituted for it. The rear end of the shaft J is attached to a block, L, which is arranged to slide diametrically in dovetailed ways on the front surface of a disk, M, which is keyed or otherwise attached to the front end of the shaft C, so as to turn therewith. The rear side of the block L is provided with screw-threaded lugs $l$, through which passes a screw-shaft, P, which has its ends journaled in lugs $m$ $m$ at two diametrically opposite points on the periphery of the disk M. One end of the screw-shaft P is provided with a sprocket-wheel, $p$, for turning it. When the screw-shaft is turned in one direction or the other, the block L is moved diametrically across the disk M, so as to move the plug or flange-former G either away from or toward the center. On the top of the frame, on two opposite sides thereof, in the rear of the disk M, are two horizontal racks, Q, arranged to slide longitudinally of the frame in ways or grooves provided for the purpose. Above these racks are bearings $s$, in which the ends of a shaft, S, are journaled. This shaft carries two pinions, R, which engage with the racks, and one end of the shaft is provided with a crank, $s^2$, for turning it by hand. The front end of each rack terminates in a projecting lip or tongue, $q$. By turning the crank in one direction or the other, the racks are propelled so as to move the lips or tongues forward beyond the plane of revolution of the disk M, or backward to the rear of said plane of revolution.

In the end plate or frame, $A^3$, is a screw-threaded bearing or seat, in which works a screw-shaft, V, having at its outer end a hand-wheel, $v$, for turning it, and carrying at its inner end a tapering plug, T, attached by a swivel-joint so as to allow the screw to turn without turning the plug. This plug may be made of shell form, as shown, so as to economize in weight and metal.

The pipe or tube to be operated upon rests on two bars, W $W^2$, supported by the upper bars, $B^2$, of the frame-work. The bar W is provided with a semicircular seat to receive the lower half of the pipe, and hinged to this bar is a similarly-shaped but shorter bar, $W^\times$, which embraces the upper half of the pipe, and is held down by a key, $w^\times$, passing through a slot in a lug, $w^{\times 2}$, which extends up from the bar W and passes through a slot in the free end of the bar $W^\times$, so as to clamp the pipe and prevent it from turning, but allows it to be moved longitudinally. The semicircular portions of the two bars W $W^\times$, when thus brought together, form practically a collar, and the side toward the end of the pipe on which the flange is to be formed is slightly rounded on the inner edge or corner, as shown in Fig. 13, so as to prevent the forming of too sharp and abrupt a shoulder in turning out the flange. The bar W is provided on its upper side, near the ends, with semi-cylindrical cavities which fit the lower half of each of the bars $B^2$. Above the bars $B^2$ are half-boxes $W^4$, provided on their under sides with semi-cylindrical cavities which fit the upper half of each of the bars $B^2$. These half-boxes are attached to the ends of the bar W by bolts $w^4$, and thus the bar is held firmly in place. The bar $W^2$ simply rests on the side bars, $B^2$, of the frame, so as to support the other end of the pipe, and it may be moved along so as to accommodate different lengths of pipe.

The operation is as follows: The pipe X to be operated upon is first heated and then laid on the bars W $W^2$, centered between the plugs and the flange-former, and is clamped in the collar formed by the semicircular portions of the bars W $W^\times$, with its inner end extending beyond said collar toward the former G for a distance equal to the desired width of the flange to be formed. The clutch E is then engaged with the pulley D, so as to set the shaft C in motion, and the former G begins its operation by expanding or turning out the metal at the end of the pipe. As the operation progresses, the pipe is fed up to the former by the plug T, actuated by the screw-shaft V, and at the same time the former G is gradually moved from a concentric to an eccentric position with relation to the shaft C by turning the screw-shaft P so as to increase the pressure of the former upon the work. As the former G has a double motion—that is to say, upon its own axis, and also upon an orbit of which the shaft C is the center—the flange is formed on the end of the pipe by the rotary outward pressure of the former on the inner surface of the metal at the end of the pipe.

To enable the screw-shaft P to operate automatically the crank $s^2$ is turned so as to cause the pinions R to move the racks Q forward until the lips or tongues $q$ project beyond the plane of revolution of the disk M. Then at each half-revolution of the disk M one of the spokes of the sprocket-wheel $p$ strikes one of the lips or tongues $q$, and the screw-shaft is given a half-turn, and thus the eccentric position of the former G is gradually increased until the flange is completed, when the clutch is disengaged, the revolution of the former is stopped, and the pipe removed, to be replaced by another.

Another mode of operation is illustrated in Figs. 14 and 15. The pipe X is adjusted so that the end of the pipe is even with the rear side of the flange portion of the former G when the former is inside of the pipe. The former then begins its operation in the position shown in Fig. 14, and continues, as shown in Fig. 15, until the flange is completed, as shown in Fig. 12.

Having thus described my invention, what I claim as new, and desire to secure by Letters Patent, is—

1. In a machine for forming flanges on the ends of the metallic pipes or tubes, a pair of supports for holding the tube or pipe in a horizontal position, an adjustable fulcrum-pin at one end of the pipe for centering it and sliding it longitudinally in its supports and against a radially-adjustable flange-former or interiorly-placed expander at the other end of the tube or pipe, substantially as described and set forth.

2. In a machine for forming flanges on the ends of metallic pipes or tubes, a tapering plug or flange-former automatically eccentrically adjustable with reference to the axis of the pipe operated upon, and arranged to form a flange on the end of the pipe between the said former and the contiguous holder or clamping plate in which the pipe is held during the flanging operation, substantially as described and set forth.

3. In a machine for forming flanges on the ends of metallic pipes, a rotary expander or flange-former automatically adjustable by suitable actuating mechanism connected with the machine, so as to move the said flange-former radially, and therefore eccentrically, at the same time that the expander is rotated and the pipe is fed up against it, substantially as described and set forth.

4. The driving-shaft C, carrying on its forward end a disk or chuck, M, in which is adjustably held a flange-former, G, which said former is provided with suitable mechanism for automatically moving it toward the periphery of the disk or chuck M as the latter rotates, thereby pressing the said former automatically farther outward, and with it the forming flange, until the flange shall have been fully pressed outward and completed, substantially as described and set forth.

5. The disk M, having peripheral lugs $m$ for holding a transverse screw-threaded shaft, P, in position across the face of the said disk, a central sliding block, L, seated in proper ways in the said disk and arranged to hold any position in the said disk either concentrically or eccentrically therewith, and combined with an automatically-operating mechanism for operating or rotating the said shaft P, and thereby adjusting the eccentricity of the former G while the machine is in operation, substantially as described and set forth.

6. The combination, with the screw-shaft P, having the sprocket-wheel $p$, of the racks Q, having the tongues or extensions $q$, and the pinions R, carried by the shaft S, working in bearings $s$ and provided with the crank $s^2$, substantially as and for the purpose herein described.

7. The shaft C, the disk or chuck M, the former G, the driving-wheel D, and the clutch E, with its operating-lever $e$, combined as described and set forth.

8. The combination, with the driving-pulley D, of the flanged collar $D^2$, attached to the shaft C by the set-screw $d^2$, and the flanged ring $D^3$, attached to the pulley by the screws $d^3$, substantially as and for the purpose herein described.

9. The combination, with the shaft C, of the flange or collar $c^2$, attached near its inner end, and the spider $A^x$, and the screw $A^{x2}$, having its point bearing against the end of the shaft, substantially as and for the purpose herein described.

10. The combination, with the bars $B^2$ of the frame-work of the machine, of the bar W and half-boxes $W^4$, secured by bolts $w^4$, as herein shown and described.

11. The combination, with the bar W, of the hinged bar $W^x$, key $w^x$, and slotted lug $w^{x2}$, as shown and described, for the purpose specified.

12. The combination, with the bars $B^2$, of the bar $W^2$ for holding the rear portion of the work, arranged as shown and described.

13. The combination, with the end plate or frame $A^3$, of the screw-shaft V, provided with the hand-wheel $v$ and carrying the swiveled plug T, as shown and described, for the purpose specified.

14. The combination and arrangement of the end plate or frame, $A^3$, horizontal bars $B^2$, collars $b^2$, and set-screws $b^x$, as shown and described, for the purpose specified.

In witness whereof I have hereunto set my hand this 16th day of April, 1884.

ALEXANDER CAMPBELL.

In presence of—
 HENRY BASE,
 JOHN S. BARNETT.